June 13, 1967  M. KESSLER  3,325,576
METHOD OF MAKING UNITARY PLASTIC SEALING CAP
Filed Feb. Filed Oct. 12, 1959
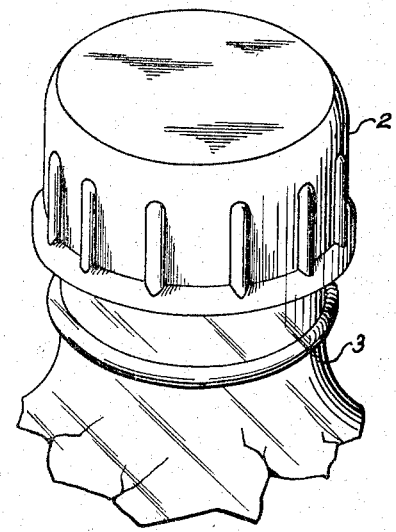
FIG. 1
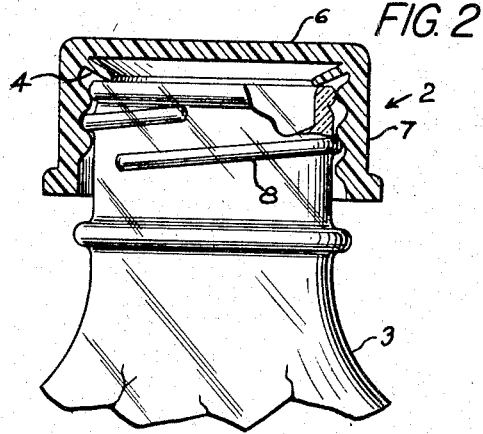
FIG. 2
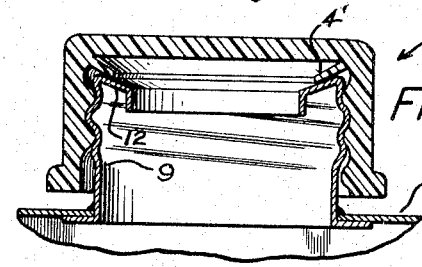
FIG. 3
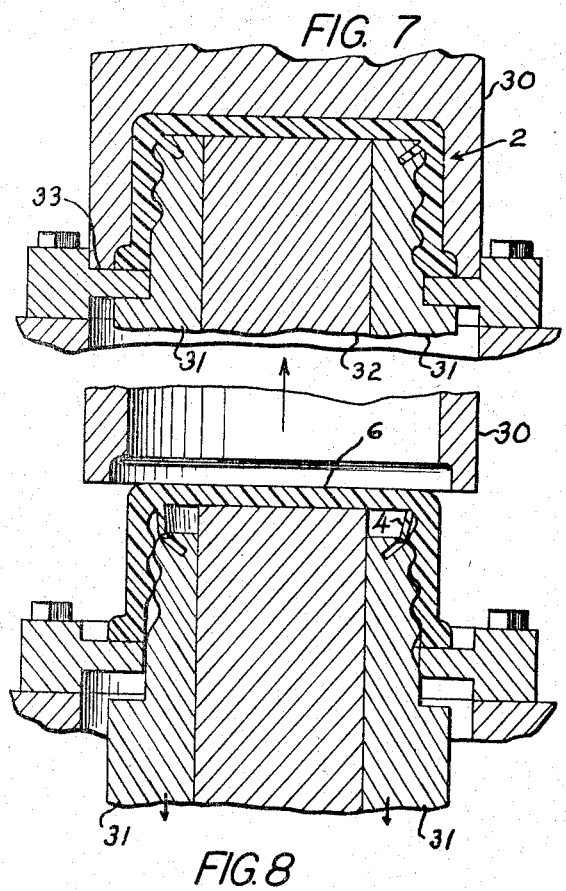
FIG. 7
FIG. 8
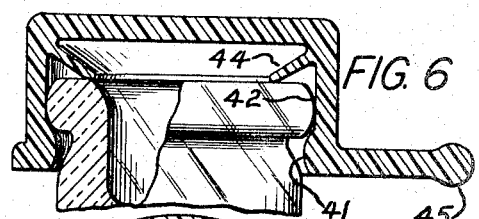
FIG. 6
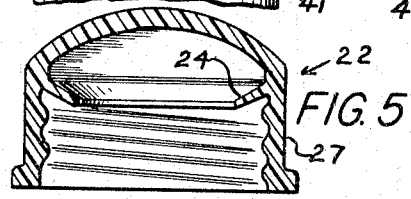
FIG. 5
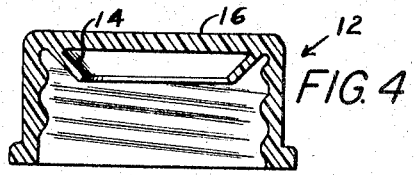
FIG. 4
INVENTOR
MILTON KESSLER
BY  Max L. Libman
ATTORNEY

United States Patent Office 3,325,576
Patented June 13, 1967

3,325,576
METHOD OF MAKING UNITARY PLASTIC SEALING CAP
Milton Kessler, 4535 Grover Drive,
Youngstown, Ohio 44512
Continuation of application Ser. No. 30,609, May 20, 1960, which is a division of application Ser. No. 845,815, Oct. 12, 1959. This application Feb. 3, 1964, Ser. No. 342,212
3 Claims. (Cl. 264—318)

This is a continuation application of my U.S. Patent application Ser. No. 30,609, filed May 20, 1960, for Method of Making Unitary Plastic Sealing Cap, which in turn is a divisional application of my U.S. patent application Ser. No. 845,815, filed Oct. 12, 1959, for Unitary Plastic Sealing Cap and Method of Making Same.

This invention relates to sealing caps such as are used for closure of bottles, screw-type metal cans, and the like, and has for its primary object the provision of a unitary plastic cap must be made sufficiently rigid so that it can be provide a completely fluid-tight closure for such containers.

Plastic caps, such as for example screw-type bottle caps, have come into widespread use. However, since the plastic cap must be made sufficiently rigid so that it can be tightly screwed down to provide a good fluid seal, the material of the cap interior which engages the lip of the orifice or pouring spout which it closes is necessarily too stiff and rigid to of itself provide a good fluid seal. It has therefore been the general practice to insert into the cap a disc of resilient material such as cork, cardboard, etc., and to face this disc with another disc of waterproof material such as metal foil or this plastic. This enables the screw cap to be screwed down tightly enough so that the resilient material is compressed, and forces the waterproof material into fluid-tight engagement with the lip of the container. This type of fabrication is obviously more expensive than a unitary molded bottle cap would be, and efforts have been made to provide a unitary plastic cap which is re-usable, but yet forms a satisfactory liquid seal. The U.S. patent to Guineg, No. 2,768,762, shows such a plastic cap.

It is a primary object of the invention to provide a method of making a unitary molded plastic cap requiring no inserts or fillers and which provides an improved fluid-tight seal as compared with any other known type of cap.

A major difficulty in the production of unitary molded plastic caps has been the requirement that the mold die must be readily extracted from the molded cap structure after it is formed, which has restricted the permissible interior shapes to those from which the die can readily be withdrawn; alternatively, the cap must be molded directly in place on the container with which it is to be used.

According to the invention, I have discovered that a unitary molded cap can be formed with a re-entrant, inwardly tapering configuration which can be made sufficiently thin and resilient to provide an excellent seal by withdrawing the die mold from the cap immediately after it has been molded, and while the material is still in a warm and fairly elastic condition, in effect, stretching the material and permitting it to return to the desired re-entrant configuration by virtue of the molecular memory of the plastic material, which causes the unitary sealing ring portion of the cap to return to its original configuration before it sets to its final hardness. In its final condition, the cap is sufficiently rigid so that it may be screwed tightly down, or otherwise secured in good sealing contact with the container opening, while the sealing portion of the cap is made sufficiently thin so that its natural resilience enables the provision of a good seal.

The specific nature of my invention, as well as other objects and advantages thereof, will clearly appear from a description of a preferred embodiment as shown in the accompanying drawing, in which:

FIG. 1 is a perspective view of the top of a bottle, showing the type of cap under consideration;

FIG. 2 is an elevation view of a screw-type bottle top, partly in section, showing the manner in which the new cap effects a seal;

FIG. 3 is a similar view showing the invention applied to a screw-type metal can;

FIGS. 4 and 5 are sectional views of modified forms of the invention;

FIG. 6 is a sectional view showing the invention applied to a non-screw type of lip-engaging cap seal; and FIGS. 7 and 8 are transverse sectional views of a mold, showing the manner in which the cap of the invention is made.

Referring to FIG. 1, it will be seen that the exterior appearance of the plastic cap 2 as applied to the top of a bottle 3 is entirely conventional. As shown in FIG. 2, the sealing portion 4 consists of a thin-walled hollow conical frustum or truncated cone having its base integrally joined to the cap at the interior junction of the flat top portion 6 and the tubular side wall portion 7 of the cap. The cap is internally screw-threaded to mate with the standard screw thread 8 usually provided on such bottles.

Any suitable molding plastic may be used, such as a hard polyethylene or vinyl plastic, and the necessary resilience of the sealing element 4 is secured by making it sufficiently thin so that it is capable of proper resilient deformation to provide the necessary fluid-tight seal. A practical cap according to the invention can readily be made which can be screwed down some 45° after the initial contact of the sealing member 4 with the lip of the bottle, which provide great sealing pressure together with sufficient permanent resilience to insure that the cap will not become loosened even under the most rigorous conditions of shaking or jarring such as may occur during shipment or transportation. The conical shape of the sealing element provides great strength, so that the cap may be screwed down as tightly as possible by hand without damaging it and without any possibility of causing the sealing element to pucker so as to destroy the seal, since the shape causes the applied force to be uniformly distributed at all points around the perimeter of contact of the sealing element. A further feature is that the shape of the seal is such that if it is used to contain fluids having internal pressure, such as carbonated beverages, the internal pressure only acts upon the interior surface of the seal to force it into still better sealing engagement.

FIG. 3 shows the invention applied to the screw-top spout 9 of a metal can 11, such as are commonly used for a great variety of purposes. This type of container is commonly made with an inwardly sloping lip 12 as shown, and the sealing lip 4' should in this case be molded at such an angle that when it is screwed down tight on the can, it will lie in substantially flat engagement with the sloping lip 12, thus providing a maximum sealing area.

It is not necessary that the sealing element be joined to the interior of the cap at the angle formed by the side and top walls as shown in FIG. 2. Alternatively, as shown in FIG. 4, the sealing element 14 may be joined to the top 16 of the cap, or as shown in FIG. 5, the corresponding truncated conical sealing element 24 may be joined to the side wall 27 of a suitably shaped cap 22.

It will be understood that to be competitively priced, the plastic cap shown must be made as cheaply as possible. The most practical and inexpensive way of doing this is by molding; however, it is apparent that the sealing element 4, due to its truncated conical configuration, provides re-entrant angles which would appear to make it impossible to mold in a single forming operation. I have discovered that this difficulty may be circumvented by taking advantage of the molecular memory of the plastic material while it is still in the warm condition immediately after it has been formed in the mold.

FIG. 7 shows the appearance of the molded article as it is formed in a mold having an upper element 30 which defines the outer surface of the cap and a two-piece inner die portion 31, 32 defining the inner surface of the cap. The rim of the cap is supported on a stationary annular member 33. Element 32 is in the form of a cylindrical plunger which is axially reciprocal within element 31.

FIG. 8 shows the manner in which the mold is freed from the cap. The top portion of the mold 30 is removed vertically in the direction indicated by the arrow while the inner mold or die section 31 is moved downwardly; however, the central plunger 32 remains in place during this phase of the operation, thus providing support for the top portion 6 of the cap, to prevent its being collapsed inwardly by atmospheric pressure while in its warm and deformable condition. It will be noted that the sealing cone 4 is distended by this operation as die element 31 is moved downwardly. However, at this time the plastic is in a warm condition and quickly returns to very nearly its original configuration.

In withdrawing from the position shown in FIG. 7 to that shown in FIG. 8, it will be apparent that a vacuum is created in the cap portion between the lower surface of the top of the cap and the top of the die portion 31. If die portions 31 and 32 were a single unitary member the top 6 of the cap would tend to collapse inwardly due to this vacuum because of the warm, soft condition of the plastic material. To prevent this, the plunger 32 remains in the position shown in FIG. 8, where it supports the top against collapse until the vacuum has been released.

The final step of the process is the withdrawal of plunger 32, after which the cap can be removed by any suitable means, either automatic or manual, as well known in the art. The operating mechanism for moving the respective parts of the mold are not shown, as these are within the skill of any mechanical designer, and per se form no part of the present invention. It will be noted that the threaded interior portion of the cap is also distended by the above-described operation, but as the threads are relatively shallow, this is easily accomplished, and the cap very quickly returns to its original dimensions, or very nearly thereto. As soon as the cap has cooled, it acquires the necessary rigidity so that it can be screwed down with as much force as is required for a tight seal.

FIG. 6 shows another form of cap, not employing a screw thread, but utilizing instead an internal lip 41, which cooperates with an external lip 42 of the bottle mouth to retain the cap in sealing position. The internal seal 44 is of the same construction as previously described, and cooperation with the bottle mouth in the same fashion. A tab 45 may be provided to facilitate removal of the cap. This type of cap is simply pressed on by hand, and is usually made of somewhat softer and more resilient plastic composition than the screw-type caps shown above. It is usually employed as a replacement cap for the crimped metal caps such as are used on bottles containing soft drinks, beer, etc.

Due to the unitary one-piece construction described above, a homogeneous cap can be inexpensively fabricated by automatic mass production methods at a lower cost than has heretofore been possible. The necessity for using a multi-piece cap construction is obviated, and a cap having very superior sealing qualities is obtained.

It will be apparent that the embodiments shown are only exemplary and that various modifications can be made in construction and arrangement within the scope of my invention as defined in the appended claims; for example, the wall thickness of seal 14 can be increased toward the base of the cone, and the exterior conical surface of the cone need not be perfectly conical as shown, but may be shaped to conform to a particular lip surface to be engaged.

I claim:

1. Method of making a substantially rigid molded plastic cap of stiff plastic material having a side wall portion open at one end and a top closure portion integrally joined to said side wall portion at the other end thereof, a lower edge extending between the inner and outer surfaces of the cap, and a flexible sealing flange portion extending for a substantial distance from the junction of the side wall and top portion of the interior surface of said cap in the form of a re-entrant hollow thin-walled truncated cone, comprising the steps of molding under heat and pressure a body of homogeneous plastic material in a separate multi-piece mold having a single unitary outer piece defining the top and side surfaces of said cap and a two-part inner form defining the inner surfaces of said cap, said inner form having separately movable parts, one being a central part for defining the flat, unobstructed center area only of the underside of said top closure portion, and the other part surrounding said one part and defining the rest of said inner surface including said sealing flange portion, said method comprising the steps of withdrawing first said outer piece and then withdrawing said other part, whereby due to the seal formed by the coacting inner surface of said truncated cone and the die portion adjacent it, a vacuum is created between the portion of said other part and the top closure portion of the cap while said other part is in contact with said interior surface of said truncated cone, said vacuum tending to collapse inwardly the central area of the top of the cap, while supporting said cap simultaneously at its lower edge and at said central area thereby preventing inward collapse of said central area.

2. The invention according to claim 1, and the additional step of subsequently withdrawing said central part from the interior of the cap while supporting the cap at its lower edge.

3. The invention according to claim 2, and the subsequent step of removing said cap from its position of support at its lower edge.

References Cited

UNITED STATES PATENTS

| 1,916,692 | 7/1933 | Scribner | 264—318 |
| 2,332,937 | 10/1943 | Schmidberger. | |
| 3,013,308 | 12/1961 | Armour | 264—318 X |

FOREIGN PATENTS

| 1,151,184 | 8/1957 | France. |

ROBERT F. WHITE, Primary Examiner.

R. B. MOFFITT, Assistant Examiner.